(12) United States Patent
Ruggeri (10) Patent No.: US 9,680,790 B2
(45) Date of Patent: Jun. 13, 2017

(54) SYSTEMS AND METHODS FOR RESOLVING DATA INCONSISTENCIES BETWEEN DOMAIN NAME SYSTEMS

(71) Applicant: MasterCard International Incorporated, Purchase, NY (US)

(72) Inventor: Daniel A. Ruggeri, St. Louis, MO (US)

(73) Assignee: MasterCard International Incorporated, Purchase, NY (US)

( * ) Notice: Subject to any disclaimer, the term of this patent is extended or adjusted under 35 U.S.C. 154(b) by 286 days.

(21) Appl. No.: 14/013,584

(22) Filed: Aug. 29, 2013

(65) Prior Publication Data

US 2015/0067114 A1    Mar. 5, 2015

(51) Int. Cl.
G06F 15/16    (2006.01)
H04L 29/12    (2006.01)
H04L 12/24    (2006.01)

(52) U.S. Cl.
CPC ...... H04L 61/1511 (2013.01); H04L 41/0866 (2013.01); H04L 61/1552 (2013.01)

(58) Field of Classification Search
None
See application file for complete search history.

(56) References Cited

U.S. PATENT DOCUMENTS

| | | | |
|---|---|---|---|
| 5,970,490 A | 10/1999 | Morgenstern | |
| 6,026,408 A | 2/2000 | Srinivasan et al. | |
| 6,092,099 A | 7/2000 | Irie et al. | |
| 6,134,559 A | 10/2000 | Brumme et al. | |
| 6,374,295 B2 | 4/2002 | Farrow et al. | |
| 6,411,966 B1 | 6/2002 | Kwan et al. | |
| 6,564,216 B2 | 5/2003 | Waters | |
| 7,680,876 B1 | 3/2010 | Cioli et al. | |
| 7,761,570 B1 * | 7/2010 | Halley | 709/226 |
| 7,865,617 B1 | 1/2011 | Pulleyn et al. | |

(Continued)

FOREIGN PATENT DOCUMENTS

| WO | 0193043 A1 | 12/2001 |
|---|---|---|
| WO | 2005106701 A2 | 11/2005 |

OTHER PUBLICATIONS

International Search Report and Written Opinion issued in International Application No. PCT/US2014/049889, mailed Nov. 24, 2014.

*Primary Examiner* — Thomas Dailey
(74) *Attorney, Agent, or Firm* — Armstrong Teasdale LLP (57) ABSTRACT

In one aspect, a computer-implemented method for managing Domain Name System (DNS) information is provided. The method uses a computing device having a processor and a memory. The method includes receiving, in the memory, source DNS data from a plurality of DNS systems including at least first source data from a first source system and second source data from a second source system. The method also includes identifying, by the processor, an inconsistency between the first source data and the second source data. The inconsistency includes an inconsistency type. The method further includes determining a solution to the inconsistency by applying one or more rules from a plurality of inconsistency rules based at least in part on the inconsistency type associated with the inconsistency. The method also includes resolving the inconsistency using the determined solution including generating resultant DNS data.

27 Claims, 5 Drawing Sheets

(56) References Cited

U.S. PATENT DOCUMENTS

| | | | |
|---|---|---|---|
| 7,930,428 B2* | 4/2011 | Drako | 709/245 |
| 8,332,433 B2 | 12/2012 | Bentkofsky et al. | |
| 8,356,106 B2* | 1/2013 | Sood | 709/229 |
| 8,364,631 B1 | 1/2013 | Gutti et al. | |
| 8,498,971 B2 | 7/2013 | Pulleyn et al. | |
| 2003/0061298 A1 | 3/2003 | Berman et al. | |
| 2005/0234954 A1 | 10/2005 | Bailey et al. | |
| 2006/0064666 A1 | 3/2006 | Amaru et al. | |
| 2008/0005127 A1* | 1/2008 | Schneider | 707/10 |
| 2010/0199122 A1* | 8/2010 | Sood | H04L 29/12066 714/4.1 |
| 2011/0113020 A1 | 5/2011 | Pulleyn et al. | |
| 2012/0297478 A1* | 11/2012 | Martin et al. | 726/22 |
| 2012/0311114 A1* | 12/2012 | Cheshire | 709/221 |
| 2013/0073524 A1 | 3/2013 | Bentkofsky et al. | |
| 2013/0291101 A1* | 10/2013 | Karasaridis | G06F 21/00 726/22 |

* cited by examiner

SYSTEMS AND METHODS FOR RESOLVING DATA INCONSISTENCIES BETWEEN DOMAIN NAME SYSTEMS

BACKGROUND OF THE DISCLOSURE

This disclosure relates generally to domain name system (DNS) servers and, more particularly, to systems and methods configured to compare DNS system data, identify inconsistencies between multiple systems' data, and resolve the inconsistencies.

DNS is a naming service commonly used in modern Internet Protocol (IP) computer networks, including the Internet. One function of DNS is to facilitate mapping of domain names, such as "www.whitehouse.gov", to a particular IP address, such as "204.93.46.227". A client computer using DNS services will receive, for example, a domain name from a user who types in "www.whitehouse.gov" into a browser. The client computer uses DNS services to translate "www.whitehouse.gov" into the IP address "204.93.46.227" for a target server (i.e., the Whitehouse's Internet server). The client computer then uses the IP address to initiate communication with the target web server. IP networks require IP addresses in order to properly communicate, but humans do not easily remember IP addresses. DNS services facilitate behind-the-scenes translation of domain names to IP addresses, thereby allowing computers and computer users to use the more easily remembered domain names rather than IP addresses when referencing other computers on the computer network.

Management of DNS services for large networks, such as the Internet, is a complex task. To distribute management responsibilities, DNS services are organized as a hierarchical system of computers (i.e., many DNS systems) that share management of many "domains" within the network. The network is organized into a "domain name space" that is divided and sub-divided into zones (also referred to as "zones of authority"), where each zone is then managed by a particular DNS system (also referred to as the "authoritative name server" for that domain). For example, "Company XY" may have a domain, and a zone of authority, for "companyxy.com". To manage that domain, Company XY may have one or more DNS servers that manage the "companyxy.com" zone.

When Company XY has multiple DNS systems managing the "companyxy.com" zone, consistency problems between DNS systems may arise. For example, presume Company XY has two separate DNS systems in use, one for their desktop users (i.e., their employees), and another for their datacenter systems (i.e., their infrastructure support servers). If a particular record within the desktop DNS system is updated with information, but the related record in the datacenter DNS system is not, then desktop users and datacenter systems will interact with different systems, or receive different responses. Such inconsistencies may have negative impacts, and sometimes difficult to detect impacts, such as routing to different versions of the same web site or to different target servers. Further, the various DNS systems may be implemented with differing DNS software. For example, the datacenter DNS system may implement Berkeley Internet Name Domain version 9 (BIND9), while the desktop DNS system may implement Microsoft® DNS with Active Directory. (Microsoft is a registered trademark of Microsoft Corporation, Redmond, Wash.). Such differing systems make comparison of configuration information difficult. What is needed is a system and method for identifying and resolving inconsistencies between DNS systems.

BRIEF DESCRIPTION OF THE DISCLOSURE

In one aspect, a computer-implemented method for managing Domain Name System (DNS) information is provided. The method uses a computing device having a processor and a memory. The method includes receiving, in the memory, source DNS data from a plurality of DNS systems including at least first source data from a first source system and second source data from a second source system. The method also includes identifying, by the processor, an inconsistency between the first source data and the second source data. The inconsistency includes an inconsistency type. The method further includes determining a solution to the inconsistency by applying one or more rules from a plurality of inconsistency rules based at least in part on the inconsistency type associated with the inconsistency. The method also includes resolving the inconsistency using the determined solution including generating resultant DNS data.

In another aspect, a computing device for managing Domain Name System (DNS) information is provided. The computing device includes a memory and a processor. The computing device is communicatively coupled to a plurality of DNS computing systems. The computing device is programmed to receive, in the memory, source DNS data from the plurality of DNS systems including at least first source data from a first source system and second source data from a second source system. The computing device is also programmed to identify an inconsistency between the first source data and the second source data. The inconsistency including an inconsistency type. The method is further programmed to determine a solution to the inconsistency by applying one or more rules from a plurality of inconsistency rules based at least in part on the inconsistency type associated with the inconsistency. The computing device is also programmed to resolve the inconsistency using the determined solution including generating resultant DNS data.

In yet another aspect, computer-readable storage media having computer-executable instructions embodied thereon are provided. When executed by at least one processor, the computer-executable instructions cause the processor to receive source DNS data from the plurality of DNS systems including at least first source data from a first source system and second source data from a second source system. The computer-executable instructions also cause the processor to identify an inconsistency between the first source data and the second source data. The inconsistency including an inconsistency type. The computer-executable instructions further cause the processor to determine a solution to the inconsistency by applying one or more rules from a plurality of inconsistency rules based at least in part on the inconsistency type associated with the inconsistency. The computer-executable instructions also cause the processor to resolve the inconsistency using the determined solution including generating resultant DNS data.

BRIEF DESCRIPTION OF THE DRAWINGS

FIGS. 1-5 show example embodiments of the methods and systems described herein.

DETAILED DESCRIPTION OF THE DISCLOSURE

The methods and systems described herein include analyzing DNS data from one or more DNS systems, analyzing that data to identify inconsistencies, and using pre-configured rules to resolve the inconsistencies. The methods and systems described herein facilitate resolving inconsistencies between and/or within DNS systems. In one embodiment, DNS data is received from a plurality of DNS systems. The DNS systems each contain, or may contain, records related to a resource such as, for example, records for a web server "www.companyxy.com".

These multiple, related records in each of the plurality of DNS systems are analyzed for inconsistencies by a management server. The management server receives the DNS data from each of the DNS systems. In some embodiments, the DNS systems utilize differing software to manage their own DNS data, and thus the DNS data is transferred to the management server in differing native formats. The management server is configured to convert the "source" DNS data from a plurality of native formats into a standard format prior to analysis. Translation into a standard format facilitates ease of data comparison between disparate formats.

The management server also identifies a set of inconsistency rules that include both DNS rules (i.e., rules for what are valid and invalid configurations of DNS systems, as defined by DNS standards), as well as business rules (i.e., customized rules put in place to support business-specific needs). The inconsistency rules are applied to the DNS data, such as to a set of related records. The inconsistency rules are used to determine whether inconsistencies exist, classifying inconsistencies, and how to remediate particular inconsistencies. For example, two related records may exist in two DNS systems, but they may contain differing values in one of their fields. As such, the rules identify and classify this scenario as a "differing common record" type inconsistency, i.e., a situation in which both systems have a related record, but in which the records do not match. The rules also facilitate determining a solution for the inconsistency based on the inconsistency type. For example, a business rule may be in place that mandates a particular solution in this case, such as that one DNS system's values for a particular record may preempt another DNS system's values.

The management server, through use of the rules, resolves the inconsistency using the determined solution. In the example embodiment, resultant DNS data is generated to resolve the inconsistency. This resultant DNS data is outputted for transmittal to and use by one or more of the DNS systems. For example, the management server outputs a new record or zone with updated values that is transferred and uploaded to one or more of the DNS systems, which will resolve the inconsistency by, for example, making that record in each of the multiple DNS systems consistent. Further, the management server converts the resultant DNS record information from the standard format to each of the DNS systems' native formats prior to transmission, thus allowing each of the DNS systems to read and utilize the updated record in their respective native formats.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the invention by way of example and not by way of limitation. It is contemplated that the invention has general application to DNS administration.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
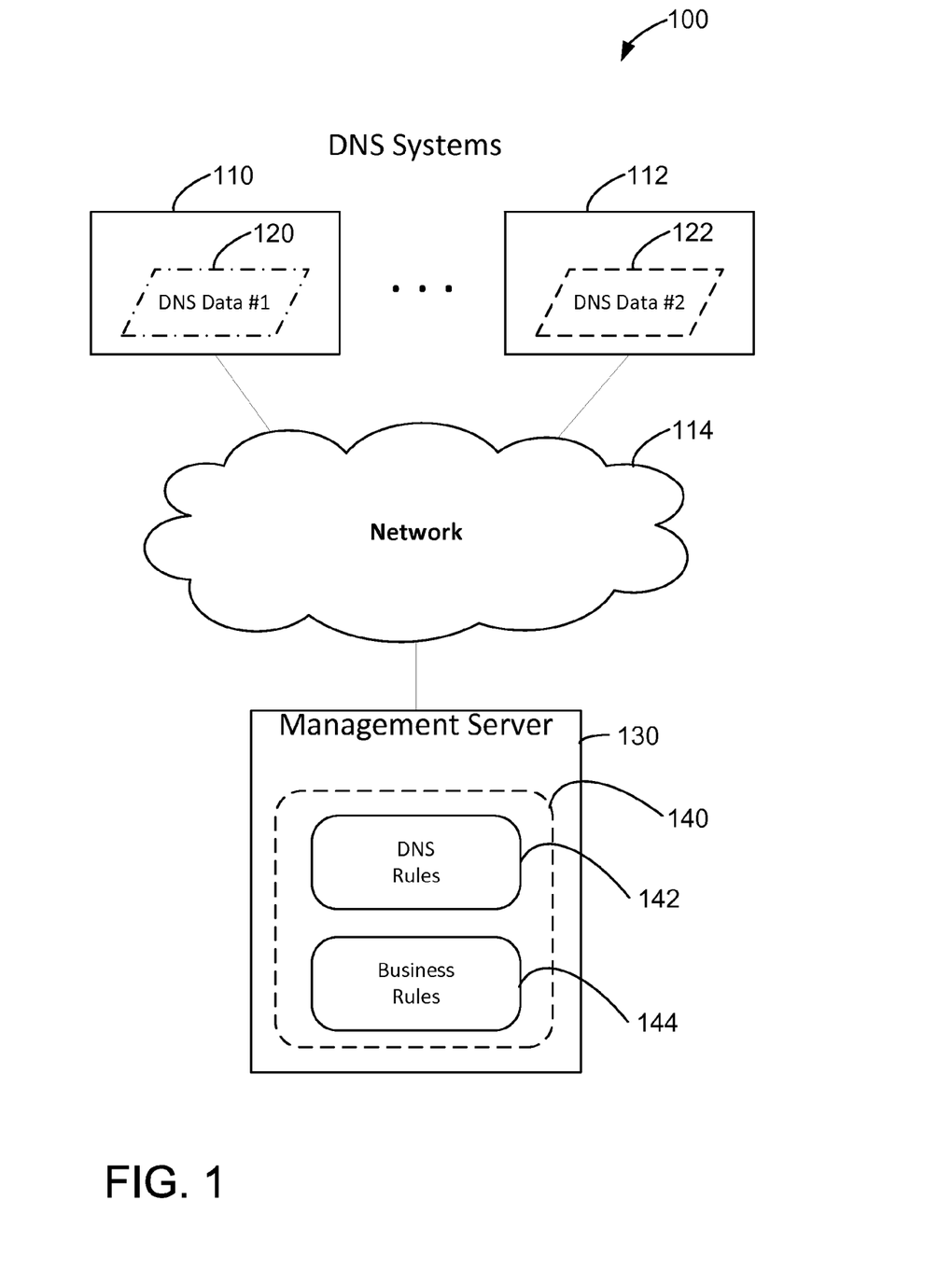
FIG. 1 is a simplified block diagram of an example computing network including a plurality of DNS systems and a management server that may be used to analyze data from DNS systems.

FIG. 1 is a simplified block diagram 100 of an example computing network 114 including a plurality of DNS systems, such as DNS systems 110 and 112, as well as a management server 130 that may be used to analyze data from DNS systems. In some embodiments, network 114 is the Internet. In other embodiments, network 114 is another IP-based network, such as a company's intranet. DNS systems 110 and 112 include DNS data such as DNS Data #1 120 and DNS Data #2 122, respectively. As used herein, the term "DNS data" generally refers to information commonly stored by DNS systems during normal operation. Such DNS data includes at least resource records, zone records, configuration files, domain names, IP addresses, Uniform Resource Locators (URLs), and other information related to managing domain name spaces. In some embodiments, DNS systems 110 and 112 may have multiple sets of DNS data, such as a single DNS system having multiple "views" or sets of DNS data, each of which may be operated on by the systems and methods described herein (e.g., DNS system 110 may include both an "external view" and an "internal view" if, for example, system 110 is handling both public users and private users). In the example embodiment, DNS Data #1 120 and DNS Data #2 122 each contain a related record (not separately shown) that will be analyzed for inconsistencies during operation.

Management server 130, in the example embodiment, includes a set of inconsistency rules 140, which include DNS rules 142 and business rules 144. DNS rules 142 include rules based on industry standards for configuration and management of DNS systems such as, for example, DNS standards defined by Requests for Comments (RFC) documents published by the Internet Engineering Task Force. Such rules help ensure that the DNS systems 110 and 112 conform to defined specifications. For example, if DNS system 110 includes an "A" record for "www.companyxy.com" and DNS system 112 contains a "CNAME" record for the same "www.companyxy.com", this represents a non-compliant configuration according to the specifications. As such, a particular rule identifying this inconsistency scenario would be included in DNS rules 142.

Business rules 144 include rules customized based on particular business needs. Some inconsistencies may not be strictly compliant based on the DNS rules 142, but may instead be made non-compliant by a custom rule that the administrator or the business entity has identified as an adverse situation specific to themselves and/or their own networks and operations. For example, a business rule may exist that requires all names to comply with a certain naming convention. As such, an inconsistency would be identified if a non-conforming name is identified. While this inconsistency is not non-compliant based on DNS rules 142, the inconsistency may be identified as non-compliant by business rules 144.

Inconsistency rules 140 are used, during operation, to identify and classify inconsistencies found between single or multiple sets of DNS data, such as DNS Data #1 120 and DNS Data #2 122. Further, inconsistency rules 140 are also used to determine a solution to the inconsistency, i.e., a remediation operation. During operation, management server 130 generates an output file (not shown) containing resultant DNS data. This resultant DNS data includes data that will be transmitted back to one or more of DNS systems 110, 112 for upload, and may include one or more remediation operations as described herein.

Inconsistency rules 140, in the example embodiment, are also used to classify the identified inconsistencies into inconsistency types. For example, inconsistency types include (a) missing zone, (b) missing record, (c) common records, (d) illegal common records, (e) legal common records, (f) differing common records, (g) inherited value detection, (h) destination format limitations, and (i) business-specific rule.

With respect to (a), a "missing zone" type inconsistency includes a scenario in which, for example, a first source system contains a zone, e.g., companyxy.com, but the second source does not. In some embodiments, for remediation operations of this type, the data structure for the zone is copied verbatim to the resultant DNS data, unless business rules 144 dictate otherwise. With respect to (b), a "missing record" type inconsistency includes a scenario in which, for example, the first source system contains a record, e.g., www.companyxy.com, but the second source does not. In some embodiments, the remediation operation for this type of inconsistency includes copying the source data structure to the resultant DNS data unchanged, unless business rules dictate otherwise. With respect to (c), "common records" type inconsistency includes a scenario in which, for example, both sources contain a common record, such as an "A" record for www.companyxy.com, and they have the same values. This indicates that each of the records is identical in both source systems. This is not considered a conflict unless business rules 144 dictate otherwise. In some embodiments, the remediation operation for this type of inconsistency (not actually an inconsistency) is merely to copy the original data, unchanged, to the resultant DNS data for each of the source systems.

With respect to (d), an "illegal common records" type inconsistency includes scenarios in which the existence of two or more records violates DNS specifications. In some embodiments, the remediation operation for this type of inconsistency requires manual intervention by an administrator. In other embodiments, business rules 144 may be defined for certain scenarios. For example, presume DNS Data #1 120 includes an "A" record that holds the value "1.2.3.4", and DNS Data #2 122 includes a "CNAME" record that holds the value "companyex.com". A business rule 144 may be defined to resolve these illegal common records with the following logic: (1) if the IP address of companyex.com is also "1.2.3.4", then either the "A" record or the "CNAME" record may be kept, but in the example embodiment, management server 130 converts the "CNAME" record to an "A" record with the value of "1.2.3.4"; (2) if the IP address of companyex.com not "1.2.3.4" (presume it is "4.5.6.7"), management server 130 may join both records into a pair of "A" records with values "1.2.3.4" and "4.5.6.7" (i.e., treat them as legal common records) or enter the conflict resolution stage as to which IP should be kept (i.e., treat them as differing common records).

With respect to (e), a "legal common records" type inconsistency includes a scenario in which, for example, the first source system contains an "A" record for "www.companyxy.com", and the second source system contains an "AAAA" record for the same "www.companyxy.com". Although this is legal per DNS specifications, conflict resolution is performed to decide if business rules prevent this. In some embodiments, for remediation operations of this type, both data structures are copied into the resultant DNS data.

With respect to (f), a "differing common records" type inconsistency includes a scenario in which, for example, the first source system includes an "A" record that indicates an IP version 4 (IPv4) address "1.2.3.4" and the second source system includes an "A" record that indicates an IPv4 address "5.6.7.8". In some embodiments, the remediation operation for this type of inconsistency requires manual intervention by an administrator. In other embodiments, remediation operations for this type of inconsistency may be dictated by business rules 144, such as a rule specifying which source system's data should preempt another source system. If such a rule is also in place, the preemptor system's data is copied into the resultant DNS data. With respect to (g), an "inherited value detection" type inconsistency includes a scenario in which, for example, the first source system and the second source system both contain a zone "companyxy.com" with a Time To Live (TTL) value of 3400 declared at the zone level, but the first source system includes an "A" record for "www.companyxy.com" having no TTL, and the second source system includes an "A" record for the same "www.companyxy.com", but having a TTL of 30. In this scenario, the first source's A record is identified as having an "inherited" TTL of 3400. Thus, the first source's A record (TTL of 3400, inherited) differs from the second source's "A" record (TTL of 30). In some embodiments, the remediation operation for this type of inconsistency is to treat this scenario as an (f) type inconsistency, (i.e., "differing common records"), and remediate with that process.

With respect to (h), a "destination format limitations" type inconsistency includes a scenario in which, for example, one of the source systems does not offer equal support for a particular functionality, such as not allowing the underscore character in DNS names, or not supporting certain resource record (RR) types. In some embodiments, the remediation operation for this type of inconsistency requires manual intervention and remediation by an administrator. With respect to (i), a "business specific rules" type inconsistency includes a scenario in which, for example, an administrator or business entity has configured a customized DNS configuration scenario that requires some remediation action. These conflicts stem from any business rule 144. Remediation, in the example embodiment, is configurable by the administrator, and varies based on the nature of the particular business rule.

As used herein, the terms "remediation" or "remediation operation" refer generally to the fixing of a problem and, more specifically, to actions taken in response to an identified inconsistency. It should be understood, however, that an "inconsistency" may not always be a problem that requires remediation, but may instead merely direct what actions or inactions are taken in response to a particular scenario. Further, as used herein, the terms "remediation" and "conflict resolution" are used interchangeably.

In some embodiments, a "failsafe" remediation may be employed. Failsafe remediation may be driven by business requirements. For example, presume a first zone "companyxy.com" is in an internal view and not accessible by customers, and a second zone "companyxy.com" is in an external view which is visible to customers. Business logic may specify that in order to ensure the external (i.e., customer facing) view is not changed by an automated program to an unsafe value, any conflicts detected will use the data for a record found in the external view over the data structure for a record found in the internal view.

Further, in some embodiments, a list of decisions made by an administrator or user of management server 130 may be provided to management server 130 prior to execution. In these cases, execution may be altered by human-made decisions on a per-record basis to decide what to do before executing the failsafe remediation operations. In cases where a conflict cannot be resolved automatically, management server 130 may exit with an error. Further, the administrator may be prompted with an option to choose remediation paths during execution or after a failure.

In the example embodiment, management server 130 parses and converts DNS data 120 and 122 to a common format. DNS systems 110 and 112 may be managed by different software products such as, for example, BIND9, maraDNS, Microsoft® Active Directory. Thus, the input files coming from DNS systems 110 and 112 may be in differing formats. In order to facilitate ease of comparison, management server 130 is configured to translate, or parse, the particular formats of the DNS systems 110 and 112 into a single, common format (also referred to herein as a standard format).

In the example embodiment, the common format is based on Java Script Object Notation (JSON). JSON is a text-based open standard designed for human-readable organization of data. An example BIND9 zone may look like the following:

```
$TTL 86400;
$ORIGIN example.com.
@         IN SOA  ns1.example.com. hostmaster.example.com. (
                  123456789 ; serial
                  5h ; refresh
                  15 ; retry
                  1w ; expire
                  5h ; minimum
                  )
          IN NS   ns1.example.com.
          IN NS   ns2.example.com.
          IN MX   10 mail.example.com.
    300 IN A  1.2.3.4
    300 IN A  9.8.7.6
www   IN CNAME example.com.
mail 3400 IN A   5.6.7.8
```

The parsed DNS data for the above example in JSON format is:

```
{
    "example.com" : {
        "_zone_metadata" : {
            "SOA" : {
                "minimum" : "5h",
                "retry" : "15",
                "email" : "hostmaster.example.com",
                "refresh" : "5h",
                "serial" : "123456789",
                "NS" : "ns1.example.com",
                "expire" : "1w"
            },
            "name" : "example.com",
            "TTL" : "86400"
        },
        "www" : [
            "CNAME",
            [
                {
                    "value" : "example.com."
                }
            ]
        ],
        "mail" : [
            "A",
            [
                {
                    "ttl" : 3400,
                    "value": "5.6.7.8"
                }
            ]
        ],
        "@" : [
            "NS",
            [
                {
                    "value" : "ns1.example.com."
                },
                {
                    "value" : "ns2.example.com."
                }
            ],
```

```
            "MX",
            [
                {
                    "priority" : "10",
                    "value" : "mail.example.com"
                }
            ],
            "A",
            [
                {
                    "ttl" : 300,
                    "value" : "1.2.3.4"
                },
                {
                    "ttl" : 300,
                    "value": "9.8.7.6"
                }
            ]
        }
    ]
}
```

In the above example, the root of the data structure is a list of zones, and there is only one zone titled "example.com". If two DNS servers are merged of all data, then the resulting data structure could potentially contain many zones. Each source system of data is represented by one of these data structures. Further, data about the zone is stored somewhere in the resulting structure. This may be considered metadata used to construct a Start of Authority ("SOA") resource record and set other parameters like the zone TTL. Also, every individual named record, such as "www" within "example.com", contains an array of items. By DNS rules, there may be many values assigned to a single name of a single record type (with a few exceptions such as "CNAME"). In the above example, there are two "A" records, the first mapping to an IPv4 IP address of 1.2.3.4, and the second to 9.8.7.6.

Also in the above example, each record type has a specific structure that conforms to DNS specification for that record type. In other words, the data structure must support the various DNS requirements placed on that record type. In the above example, most record types ("NS", "A", and "CNAME") contain only a value. However, the "MX" record type has a value as well as a priority, because those attributes are required for each mail server. Management server 130, in the example embodiment, supports all defined record types.

Further, in the example embodiment, some values may be omitted if they are not necessary or are inherited. For example, as in the above example, a TTL is defined for each of the "A" records. For the "CNAME" value, TTL is not configured on the record, but is instead inherited from the zone. Thus, without being defined explicitly in the data file, we know that the TTL for "www.example.com" is 96400, since it is inherited from the zone.

While the example embodiments described herein utilize data from a plurality of sources, it should be understood that some aspects of the present disclosure may be gathered from a single source. As such, some of the rules may be applied to a single source without comparing to other source data.

Figure 2:
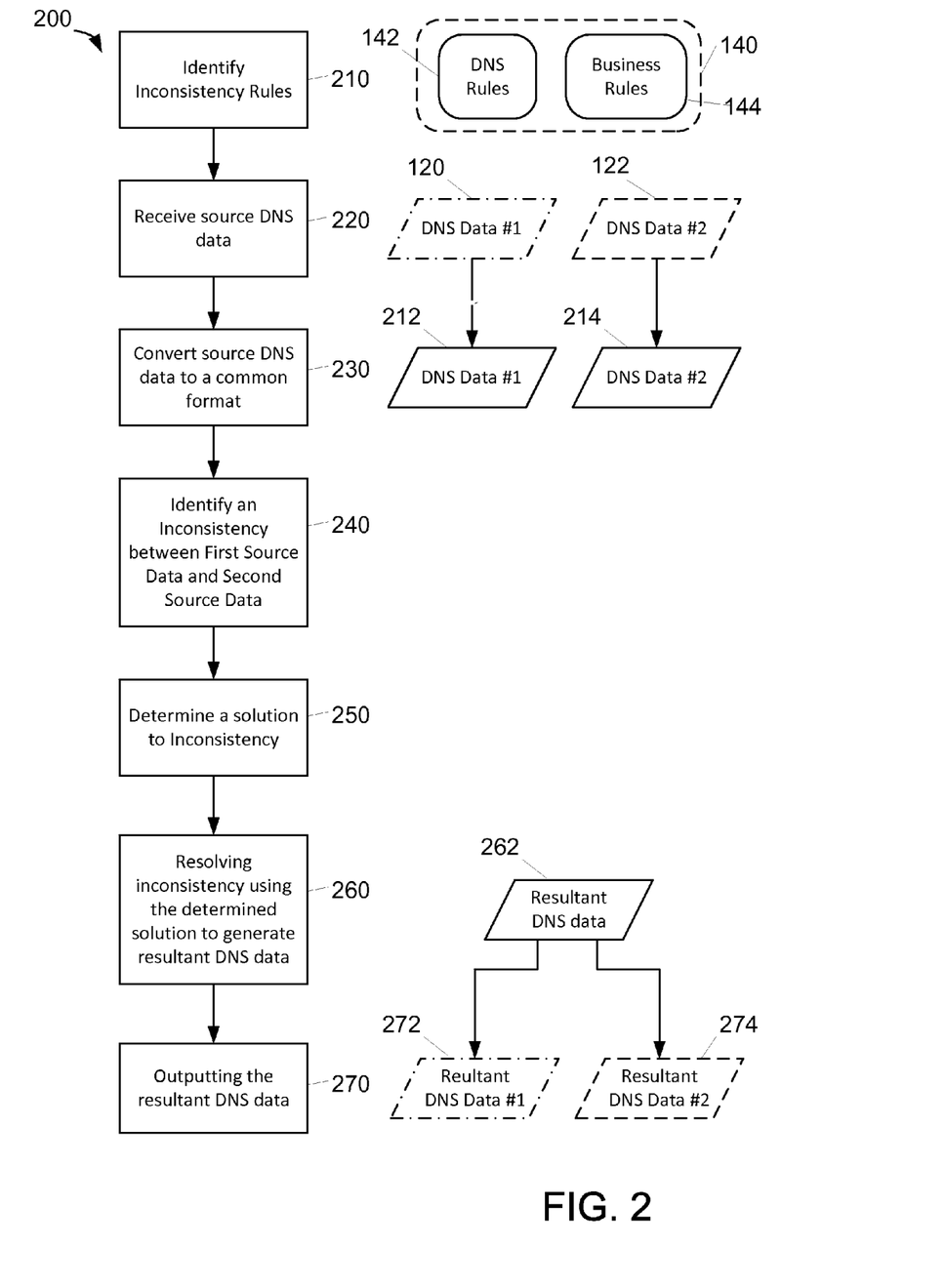
FIG. 2 is an example method for resolving data inconsistencies between DNS systems.

FIG. 2 is an example method 200 for resolving data inconsistencies between DNS systems 110 and 112 (shown in FIG. 1). In the example embodiment, method 200 is implemented by a computing device, such as management server 130 (shown in FIG. 1). Method 200 includes identifying 210 inconsistency rules, such as inconsistency rules 140, which includes DNS rules 142 and business rules 144.

Method 200 also includes receiving 220 source DNS data, such as DNS Data #1 120 and DNS Data #2 122, from a plurality of DNS systems. Although only 2 source DNS data sets are shown herein, it should be understood that the systems and methods described herein are configured to handle more than 2 data sets as well. In some embodiments, DNS data is formatted in differing formats (i.e., source formats), and is converted 230 from the source format to a common format, such as DNS Data #1 212 and DNS Data #2 214.

Method 200, in the example embodiment, also includes identifying 240 an inconsistency between DNS data sources, such as DNS Data #1 212 and DNS Data #2 214. In some embodiments, identifying 240 includes identifying a difference or a conflict between a zone and/or a record in one DNS data set and a related zone and/or record in at least one other DNS data set. In other embodiments, identifying 240 includes identifying an inconsistency type associated with the inconsistency, such as the inconsistency types discussed above. In some embodiments, identifying 240 includes identifying an inconsistency rule associated with the inconsistency type from inconsistency rules 140, where the inconsistency rules also include rules for resolving the inconsistency. A solution is determined 250 by applying one or more rules from inconsistency rules 140 based on the inconsistency type.

Method 200 resolves 260 the inconsistency using the determined 250 solution, thus generating a resultant DNS data 262. Resultant DNS data 262 is outputted 270 for use by one or more of the source DNS systems. In the example embodiment, resultant DNS data 262 is converted from the common format back to a native format of the particular source DNS system, such as resultant DNS Data #1 272 and resultant DNS Data #2 274.

Figure 3:
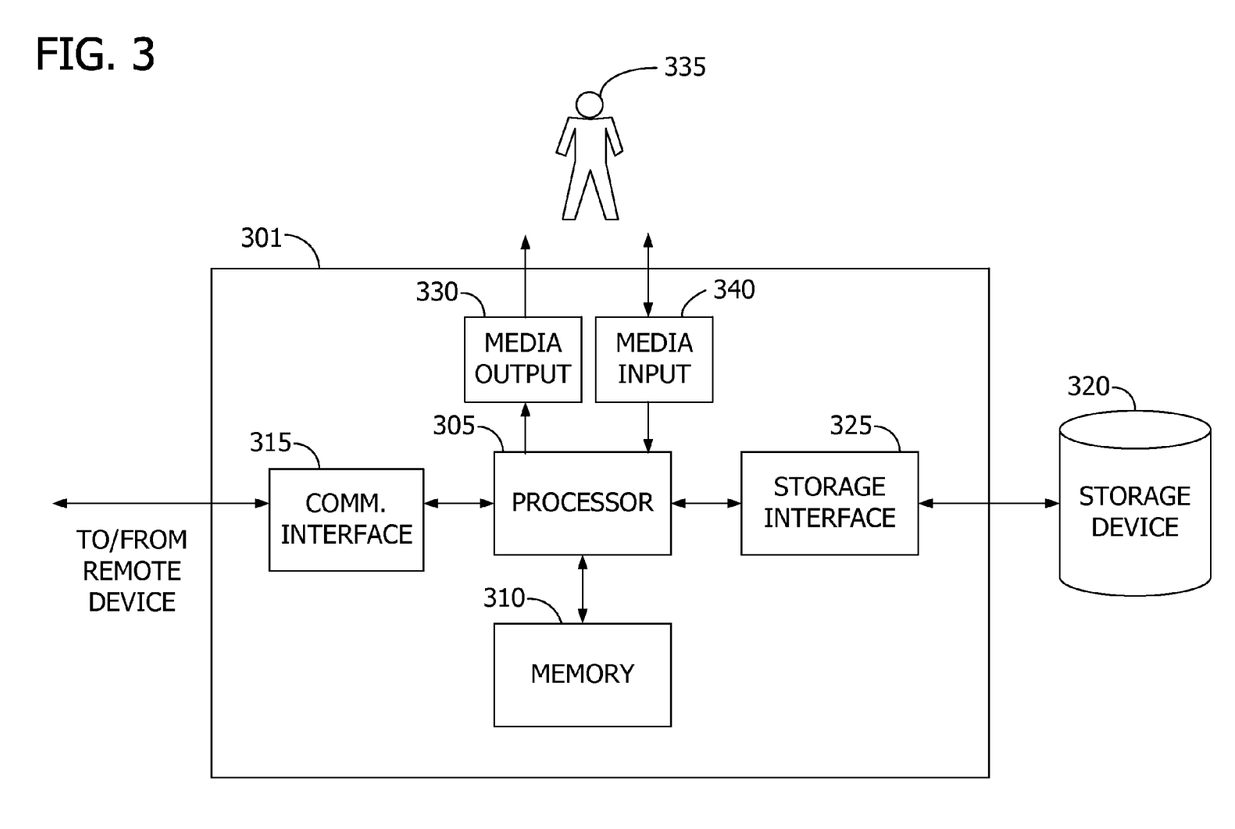
FIG. 3 illustrates an example configuration of a computing system that may be used to resolve data inconsistencies between DNS systems.

FIG. 3 illustrates an example configuration of a computing system 301 that may be used to resolve data inconsistencies between DNS systems. In some embodiments, computing system 301 is similar to management server 130 (shown in FIG. 1). In the example embodiment, computing system 301 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

Computing system 301 also includes at least one media output component 330 for presenting information to user 335. Media output component 330 is any component capable of conveying information to user 335. In some embodiments, media output component 330 includes an output adapter such as a video adapter and/or an audio adapter. In some embodiments, media output component 330 may be a log file that includes output describing actions taken by system 301. An output adapter is operatively coupled to processor 305 and operatively couplable to an output device such as a display device, a liquid crystal display (LCD), organic light emitting diode (OLED) display, or "electronic ink" display, or an audio output device, a speaker or headphones.

In some embodiments, computing system 301 includes an input device 340 for receiving input from user 335. Input device 340 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 330 and input device 340. Computing system 301 may also include a communication interface 315, which is communicatively couplable to a remote device, such as DNS systems 110 and 112 (shown in FIG. 1). Communication interface 315 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 335 via media output component 330 and, optionally, receiving and processing input from input device 340. A user interface may include, among other possibilities, a web browser and client application. Web browsers enable users, such as user 335, to display and interact with media and other information typically embedded on a web page or a website. A client application allows user 335 to interact with a server application.

Processor 305 may also be operatively coupled to a storage device 320. Storage device 320 is any computer-operated hardware suitable for storing and/or retrieving data. In some embodiments, storage device 320 is integrated in server system 301. For example, computing system 301 may include one or more hard disk drives as storage device 320. In other embodiments, storage device 320 is external to computing system 301 and may be accessed by a plurality of computing systems 301. For example, storage device 320 may include multiple storage units such as hard disks or solid state disks in a redundant array of inexpensive disks (RAID) configuration. Storage device 320 may include a storage area network (SAN) and/or a network attached storage (NAS) system.

In some embodiments, processor 305 is operatively coupled to storage device 320 via a storage interface 325. Storage interface 325 is any component capable of providing processor 305 with access to storage device 320. Storage interface 325 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 325 with access to storage device 320.

In operation, in the example embodiment, user 335, such as a DNS administrator, uses computing system 301 to interact with DNS systems 110 and 112 (shown in FIG. 1). User 335 manages and analyzes DNS systems and operations as described herein.

Figure 4:
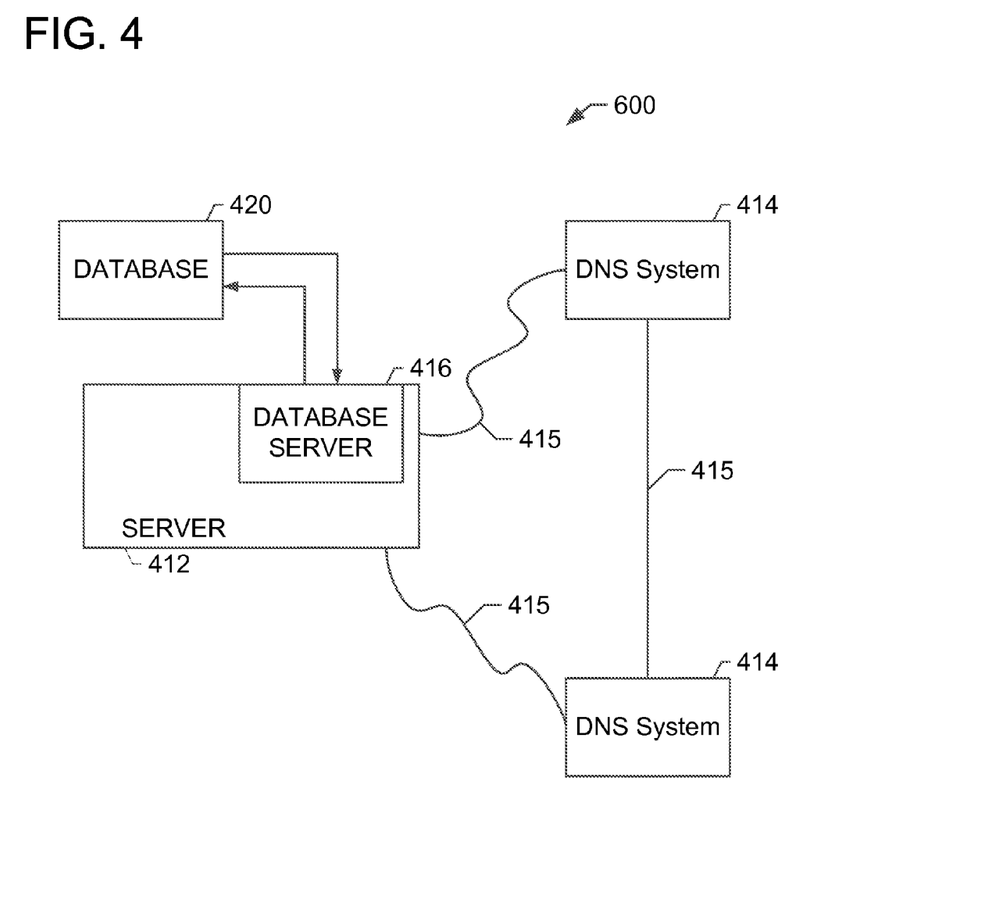
FIG. 4 is a simplified block diagram of an example DNS data analysis system including a plurality of computer devices connected in communication in accordance with the present disclosure.

FIG. 4 is a simplified block diagram of an example DNS data analysis system 400 including a plurality of computer devices connected in communication in accordance with the present disclosure. In the example embodiment, system 400 is used for collecting and analyzing data from DNS systems to identify and resolve inconsistencies.

More specifically, in the example embodiment, system 400 includes a server system 412, and a plurality of client sub-systems, also referred to as DNS systems 414, connected to server system 412. In one embodiment, DNS systems 414 are systems similar to DNS systems 110 and 112 (shown in FIG. 1), and server system 412 is similar to management server 130 (shown in FIG. 1) and/or computing device 310 (shown in FIG. 3). DNS systems 414 may be interconnected to the Internet and/or local networks through many interfaces including a network 415, such as a local area network (LAN) or a wide area network (WAN), dial-in-connections, cable modems, special high-speed Integrated Services Digital Network (ISDN) lines, and RDT networks. DNS systems 414 could be any device capable of interconnecting to the Internet or other IP-based network.

In the example embodiment, a database server 416 operates on server system 412, and is connected to database 420, which contains information on a variety of matters, as described above. In one embodiment, centralized database 420 can be accessed by potential users at one of DNS systems 414 by logging onto database server 412 through one of DNS systems 414. In an alternative embodiment, database 420 is stored remotely from database server system 412 and may be non-centralized.

Database 420 may include a single database having separated sections or partitions, or may include multiple databases, each being separate from each other. Database 420 may store DNS data collected over network 415. Database 420 may also store inconsistency rule data, including DNS rules and business rules. Database 420 may also store resultant DNS data.

Figure 5:
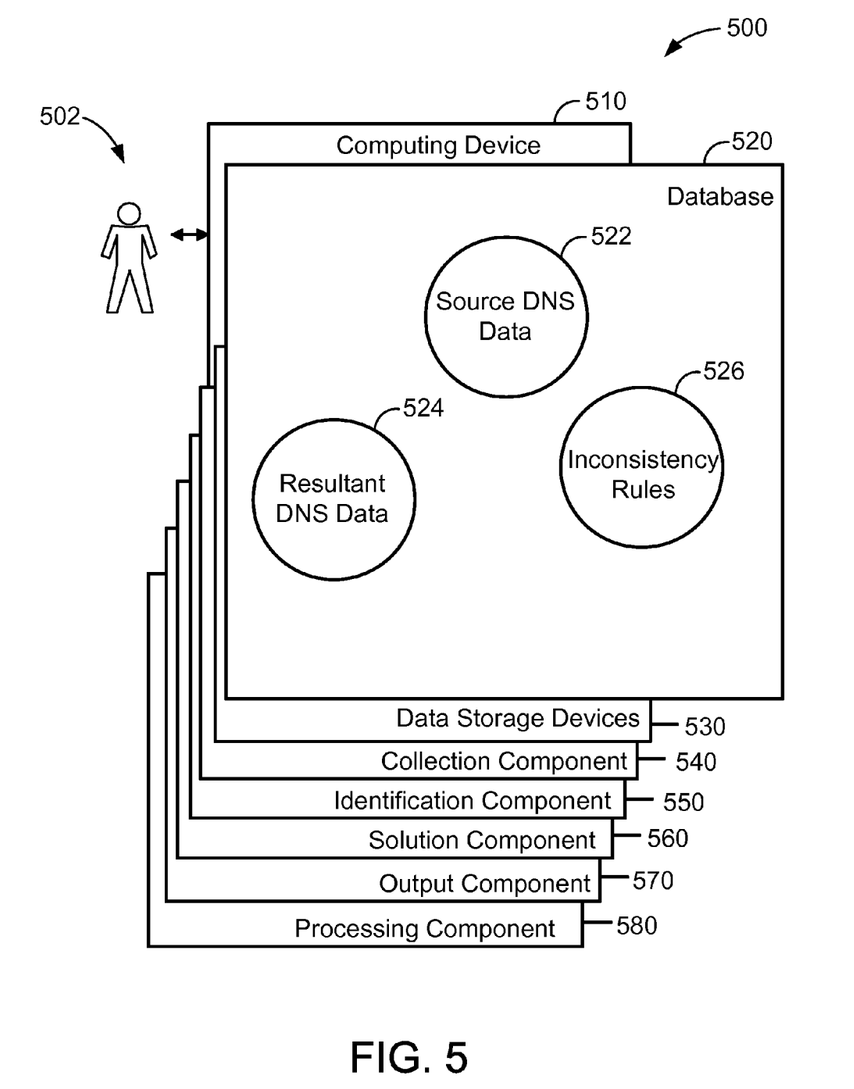
FIG. 5 shows an example configuration of a database within a computing device, along with other related computing components, that may be used to analyze DNS data.

FIG. 5 shows an example configuration 500 of a database 520 within a computing device 510, along with other related computing components, that may be used to analyze DNS data. In some embodiments, computing device 510 is similar to management server 130 (shown in FIG. 1) and/or server system 412 (shown in FIG. 4). Database 520 is coupled to several separate components within computing device 510, which perform specific tasks.

In the exemplary embodiment, database 520 includes source DNS data 522, resultant DNS data 524, and inconsistency rules data 526. In some embodiments, database 520 is similar to database 420 (shown in FIG. 4). Source DNS data 522 includes information associated with DNS configuration information from DNS systems such as DNS systems 110 and 112 (shown in FIG. 1), and in some embodiments is similar to DNS Data #1 120, DNS Data #2 122, DNS Data #1 212, and/or DNS Data #2 214 (shown in FIG. 2). Resultant DNS data 524 includes data generated by the systems and methods described herein, and in some embodiments is similar to resultant DNS Data 262, resultant DNS Data #1 272, and/or resultant DNS Data #2 274 (shown in FIG. 2). Inconsistency rules data 526 includes DNS rules and business rules, inconsistency types, and solutions for inconsistencies. In some embodiments, inconsistency rules data 526 is similar to inconsistency rules 140 (shown in FIG. 2).

Computing device 510 includes the database 520, as well as data storage devices 530. Computing device 510 also includes a collection component 540 for receiving source DNS data 522 into database 520 from DNS systems (not shown in FIG. 5) and converting source DNS data into a common format. Computing device 510 also includes an identification component 550 for applying inconsistency rules 526 to identify inconsistencies in the source DNS data. A solution component 560 is also included for determining a solution to identified inconsistencies and resolving inconsistencies by generating resultant DNS data 524 that is transmitted to DNS systems. A processing component 580 assists with execution of computer-executable instructions associated with the DNS data analysis system.

The above-described embodiments are methods and systems of resolving data inconsistencies between and/or within DNS systems. The system collects source DNS data from DNS systems and processes the source DNS data through a set of inconsistency rules. As inconsistencies are found, the system applies solutions to the inconsistencies to generate a resultant DNS data set that includes resolutions to the discovered inconsistencies. As a result, the methods and systems described herein facilitate remediation of inconsistencies between and/or within DNS systems.

As will be appreciated based on the foregoing specification, the above-described embodiments of the disclosure may be implemented using computer programming or engineering techniques including computer software, firmware, hardware or any combination or subset thereof, wherein the technical effect is identifying inconsistency rules, receiving source DNS data, converting source DNS data into a common format, identifying inconsistencies between source DNS data, determining solutions to inconsistencies, resolving inconsistencies by generating resultant DNS data, and outputting the resultant DNS data for use by DNS systems. Any such resulting program, having computer-readable code means, may be embodied or provided within one or more computer-readable media, thereby making a computer program product (i.e., an article of manufacture) according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. In other words, the machine-readable medium and the computer-readable medium described herein are non-transitory. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for managing Domain Name System (DNS) information, said method using a computing device having a processor and a memory, said method comprising:

receiving, in the memory, source DNS data from a plurality of DNS systems including at least a first plurality of records retrieved in response to a first query of a first source DNS server and a second plurality of records retrieved in response to a second query of a second source DNS server;

identifying, by the processor, an inconsistency between the first plurality of records and the second plurality of records, the inconsistency including an inconsistency type;

determining a solution to the inconsistency by applying one or more rules from a plurality of inconsistency rules based at least in part on the inconsistency type associated with the inconsistency;

resolving the inconsistency using the determined solution including generating an output file that includes resultant DNS data that, when used by one or more DNS systems of the plurality of DNS systems, resolves the inconsistency; and outputting the output file for upload by the one or more DNS systems of the plurality of DNS systems to resolve the inconsistency.

2. The method of claim 1 further comprising:

identifying the plurality of inconsistency rules including a set of business-specific rules and a set of DNS rules; and outputting the resultant DNS data for use by one or more DNS systems of the plurality of DNS systems.

3. The method of claim 1 further comprising converting the first plurality of records and the second plurality of records to a common data format.

4. The method of claim 1, wherein determining a solution further comprises:

determining a plurality of solutions to the inconsistency;

displaying the plurality of solutions to a user of the computing device; and receiving, from the user, a selection of the solution from the plurality of solutions, thereby identifying the determined solution to resolve the inconsistency.

5. The method of claim 1, wherein receiving source DNS data further comprises receiving source DNS data from the plurality of DNS systems in one or more native formats, wherein outputting the resultant DNS data further comprises constructing an output file for each DNS system of the plurality of DNS systems using the resultant DNS data in the one or more native formats.

6. The method of claim 1, wherein identifying an inconsistency further comprises identifying a difference between a first zone within the first plurality of records and a second zone within the second plurality of records, wherein the first zone and the second zone are related.

7. The method of claim 1, wherein identifying an inconsistency further comprises identifying a conflict between a first record within the first plurality of records and a second record within the second plurality of records, wherein the first record and the second record are related.

8. The method of claim 1, wherein identifying an inconsistency further comprises identifying an inconsistency type that includes at least one of a missing zone, a missing record, common records, illegal common records, legal common records, differing common records, an inherited value detection, a destination format limitation, and a pre-defined inconsistency.

9. The method of claim 8, wherein identifying an inconsistency further comprises identifying an inconsistency rule from the plurality of inconsistency rules, the identified inconsistency rule being associated with the inconsistency type, wherein resolving the inconsistency further comprises applying the inconsistency rule to one or more of the first plurality of records and the second plurality of records to generate the resultant DNS data.

10. The method of claim 1, wherein receiving a plurality of inconsistency rules comprises receiving a plurality of inconsistency rules including rules associated with DNS standards compliance logic.

11. A computing device for managing Domain Name System (DNS) information, said computing device comprising a memory and a processor, said computing device communicatively coupled to a plurality of DNS computing systems, said computing device programmed to:
receive, in the memory, source DNS data from a plurality of DNS systems including at least first plurality of records retrieved in response to a first query of a first source DNS server and second plurality of records retrieved in response to a second query of a second source DNS server;
identify, by the processor, an inconsistency between the first plurality of records and the second plurality of records, the inconsistency including an inconsistency type;
determine a solution to the inconsistency by applying one or more rules from a plurality of inconsistency rules based at least in part on the inconsistency type associated with the inconsistency;
resolve the inconsistency using the determined solution including generating an output file that includes resultant DNS data that, when used by one or more DNS systems of the plurality of DNS systems, resolves the inconsistency; and
outputting the output file for upload by the one or more DNS systems of the plurality of DNS systems to resolve the inconsistency.

12. The computing device of claim 11, wherein said computing device is further programmed to:
receive, in the memory, the plurality of inconsistency rules including a set of business-specific rules and a set of DNS rules; and
output the resultant DNS data for use by one or more DNS systems of the plurality of DNS system.

13. The computing device of claim 11, wherein said computing device is further programmed to convert the first plurality of records and the second plurality of records to a common data format.

14. The computing device of claim 11, wherein said computer device is further programmed to:
determine a plurality of solutions to the inconsistency;
display the plurality of solutions to a user of the computing device; and
receive, from the user, a selection of the solution from the plurality of solutions, thereby identifying the determined solution to resolve the inconsistency.

15. The computing device of claim 11, wherein said computer device is further programmed to construct an output file in one or more native formats for one or more DNS systems of the plurality of DNS systems using the resultant DNS data.

16. The computing device of claim 11, wherein said computer device is further programmed to identify a difference between a first zone within the first plurality of records and a second zone within the second plurality of records, wherein the first zone and second zone are related.

17. The computing device of claim 11, wherein said computer device is further programmed to identify a conflict between a first record within the first plurality of records and a second record within the second plurality of records, wherein the first record and second record are related.

18. The computing device of claim 11, wherein said computer device is further programmed to identify an inconsistency type that includes at least one of a missing zone, a missing record, common records, illegal common records, legal common records, differing common records, an inherited value detection, a destination format limitation, and a pre-defined inconsistency.

19. The computing device of claim 18, wherein said computer device is further programmed to:
identify an inconsistency rule from the plurality of inconsistency rules, the inconsistency rule is associated with the inconsistency type; and
apply the inconsistency rule to one or more of the first plurality of records and the second plurality of records to generate the resultant DNS data.

20. A non-transitory computer-readable storage media having computer-executable instructions embodied thereon, wherein when executed by at least one processor, the computer-executable instructions cause the processor to:
receive source DNS data from a plurality of DNS systems including at least first plurality of records retrieved in response to a first query of a first source DNS server and second plurality of records retrieved in response to a second query of a second source DNS server;
identify an inconsistency between the first plurality of records and the second plurality of records, the inconsistency including an inconsistency type;
determine a solution to the inconsistency by applying one or more rules from a plurality of inconsistency rules based at least in part on the inconsistency type associated with the inconsistency;
resolve the inconsistency using the determined solution including generating an output file that includes resultant DNS data that, when used by one or more DNS systems of the plurality of DNS systems, resolves the inconsistency; and
outputting the output file for upload by the one or more DNS systems of the plurality of DNS systems to resolve the inconsistency.

21. The non-transitory computer-readable storage media of claim 20, wherein the computer-executable instructions further cause the processor to:
receive the plurality of inconsistency rules including a set of business-specific rules and a set of DNS rules; and
output the resultant DNS data for use by one or more DNS systems of the plurality of DNS system.

22. The non-transitory computer-readable storage media of claim 20, wherein the computer-executable instructions further cause the processor to convert the first plurality of records and the second plurality of records to a common data format.

23. The non-transitory computer-readable storage media of claim 20, wherein the computer-executable instructions further cause the processor to:
determine a plurality of solutions to the inconsistency;
display the plurality of solutions to a user of the computing device; and
receive, from the user, a selection of the solution from the plurality of solutions, thereby identifying the determined solution to resolve the inconsistency.

24. The non-transitory computer-readable storage media of claim 20, wherein the computer-executable instructions further cause the processor to construct an output file in one or more native formats for one or more DNS systems of the plurality of DNS systems using the resultant DNS data.

25. The non-transitory computer-readable storage media of claim 20, wherein the computer-executable instructions further cause the processor to identify a difference between a first zone within the first plurality of records and a second zone within the second plurality of records, wherein the first zone and second zone are related.

26. The non-transitory computer-readable storage media of claim 20, wherein the computer-executable instructions further cause the processor to identify a conflict between a first record within the first plurality of records and a second record within the second plurality of records, wherein the first record and second record are related.

27. The non-transitory computer-readable storage media of claim 20, wherein the plurality of inconsistency rules includes rules associated with DNS standards compliance logic.

* * * * *